United States Patent
Kurata

(10) Patent No.: US 10,529,318 B2
(45) Date of Patent: Jan. 7, 2020

(54) IMPLEMENTING A CLASSIFICATION MODEL FOR RECOGNITION PROCESSING

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1195 days.

(21) Appl. No.: 14/815,564

(22) Filed: Jul. 31, 2015

(65) Prior Publication Data
US 2017/0032244 A1    Feb. 2, 2017

(51) Int. Cl.
| | |
|---|---|
| G10L 15/16 | (2006.01) |
| G10L 15/06 | (2013.01) |
| G06N 3/04 | (2006.01) |
| G06N 3/08 | (2006.01) |

(52) U.S. Cl.
CPC ............ *G10L 15/16* (2013.01); *G06N 3/0454* (2013.01); *G06N 3/0472* (2013.01); *G06N 3/084* (2013.01); *G10L 15/063* (2013.01)

(58) Field of Classification Search
None
See application file for complete search history.

(56) References Cited

U.S. PATENT DOCUMENTS

| | | | | |
|---|---|---|---|---|
| 2006/0167692 | A1* | 7/2006 | Basu | G10L 25/48 |
| | | | | 704/258 |
| 2010/0299303 | A1* | 11/2010 | Horster | G06F 16/3346 |
| | | | | 706/52 |

(Continued)

OTHER PUBLICATIONS

Abdel-Hamid, O. et al. (Mar. 2012). "Applying convolutional neural networks concepts to hybrid NN-HMM model for speech recognition". In Acoustics, Speech and Signal Processing (ICASSP), 2012 IEEE International Conference on (pp. 4277-4280). IEEE . DOI:10.1109/ICASSP.2012.6288864 (Year: 2012).*

(Continued)

*Primary Examiner* — Kamran Afshar
*Assistant Examiner* — Benjamin J Buss
(74) *Attorney, Agent, or Firm* — Tutunjian & Bitetto, P.C.; Vazken Alexanian

(57) ABSTRACT

A method, system, and computer program product for learning a recognition model for recognition processing. The method includes preparing one or more examples for learning, each of which includes an input segment, an additional segment adjacent to the input segment and an assigned label. The input segment and the additional segment are extracted from an original training data. A classification model is trained, using the input segment and the additional segment in the examples, to initialize parameters of the classification model so that extended segments including the input segment and the additional segment are reconstructed from the input segment. Then, the classification model is tuned to predict a target label, using the input segment and the assigned label in the examples, based on the initialized parameters. At least a portion of the obtained classification model is included in the recognition model.

24 Claims, 13 Drawing Sheets

(56) References Cited

U.S. PATENT DOCUMENTS

| | | | |
|---|---|---|---|
| 2012/0057779 A1* | 3/2012 | El Dokor | G06N 3/02 382/154 |
| 2012/0065976 A1* | 3/2012 | Deng | G06N 3/084 704/256.1 |
| 2012/0072215 A1* | 3/2012 | Yu | G06N 3/084 704/240 |
| 2013/0138436 A1* | 5/2013 | Yu | G06N 3/08 704/232 |
| 2014/0079297 A1* | 3/2014 | Tadayon | G06K 9/00 382/118 |
| 2014/0149112 A1* | 5/2014 | Kalinli-Akbacak | G10L 25/03 704/232 |
| 2014/0201126 A1* | 7/2014 | Zadeh | G06N 7/005 706/52 |
| 2015/0066496 A1* | 3/2015 | Deoras | G06N 3/0472 704/232 |
| 2015/0238148 A1* | 8/2015 | Georgescu | A61B 5/7267 600/408 |
| 2015/0278441 A1* | 10/2015 | Min | G06N 20/00 706/12 |
| 2016/0117587 A1* | 4/2016 | Yan | G06N 3/08 706/20 |
| 2016/0275947 A1* | 9/2016 | Li | G10L 15/20 |
| 2016/0328643 A1* | 11/2016 | Liu | G06N 3/084 |
| 2016/0350648 A1* | 12/2016 | Gilad-Bachrach | G06N 3/08 |
| 2016/0364522 A1* | 12/2016 | Frey | G06N 3/04 |
| 2016/0379665 A1* | 12/2016 | Kurata | G10L 15/063 704/232 |
| 2017/0061978 A1* | 3/2017 | Wang | G10L 21/0232 |
| 2018/0089530 A1* | 3/2018 | Liu | G06K 9/4628 |

OTHER PUBLICATIONS

Badino, L. et al. (Dec. 2012). "Deep-level acoustic-to-articulatory mapping for DBN-HMM based phone recognition". In Spoken language technology workshop (SLT), 2012 IEEE (pp. 370-375). IEEE. DOI:10.1109/SLT.2012.6424252 (Year: 2012).*

Dahl, G.E. et al. (2010). "Phone recognition with the mean-covariance restricted Boltzmann machine". In Advances in neural information processing systems (pp. 469-477). (Year: 2010).*

Dahl, G.E. et al. (2012). "Context-dependent pre-trained deep neural networks for large-vocabulary speech recognition". IEEE Transactions on audio, speech, and language processing, 20(1), 30-42. DOI:10.1109/TASL.2011.2134090 (Year: 2012).*

Hinton, G.E. et al. (2006). "A fast learning algorithm for deep belief nets". Neural computation, 18(7), 1527-1554. (Year: 2006).*

Hinton, G.E. et al. (2006). "Reducing the dimensionality of data with neural networks". Science, 313(5786), 504-507. DOI:10.1126/science.1127647 (Year: 2006).*

Krizhevsky, A. et al. (2012). "InnageNet classification with deep convolutional neural networks". In Advances in neural information processing systems 25 (NIPS 2012). (pp. 1097-1105). (Year: 2012).*

Miao, Y. et al. (2013, Dec.). "Deep maxout networks for low-resource speech recognition". In Automatic Speech Recognition and Understanding (ASRU), 2013 IEEE Workshop on (pp. 398-403). IEEE. DOI:10.1109/ASRU.2013.6707763 (Year: 2013).*

Nguyen, Q.B. et al. (Nov. 2013). "Optimizing deep bottleneck feature extraction". In Computing and Communication Technologies, Research, Innovation, and Vision for the Future (RIVF), 2013 IEEE RIVF International Conference on (pp. 152-156). IEEE. (Year: 2013).*

Pan, J. et al. (Dec. 2012). "Investigation of deep neural networks (DNN) for large vocabulary continuous speech recognition: Why DNN surpasses GMMs in acoustic modeling". In Chinese Spoken Language Processing (ISCSLP), 2012 8th International Symposium on (pp. 301-305). IEEE. (Year: 2012).*

Sainath, T.N. et al. (Mar. 2012). "Auto-encoder bottleneck features using deep belief networks". In Acoustics, Speech and Signal Processing (ICASSP), 2012 IEEE International Conference on (pp. 4153-4156). IEEE. DOI:10.1109/ICASSP.2012.6288833 (Year: 2012).*

Yoshioka, T. et al. (Dec. 2014). "Environmentally robust ASR front-end for deep neural network acoustic models". Computer Speech & Language, 31(1), 65-86. Availalbe online Dec. 4, 2014. DOI:10.1016/j.csl.2014.11.008 (Year: 2014).*

Yu, D. et al. (Dec. 2010). "Roles of pre-training and fine-tuning in context-dependent DBN-HMMs for real-world speech recognition". In Proc. NIPS Workshop on Deep Learning and Unsupervised Feature Learning. (Year: 2010).*

Hinton, G., et al., "Deep Neural Networks for Acoustic Modeling in Speech Recognition," Signal Processing Magazine, vol. 29, No. 6, Nov. 2012. (pp. 1-27).

Mohamed, a., et al., "Acoustic Modeling using Deep Belief Networks," IEEE Transactions on Audio, Speech, and Language Processing, vol. 20, No. 1, Jan. 2011. (pp. 1-10).

Taylor, G. W., "Composable, distributed-state models for high-dimensional time series," Thesis for Graduate Department of Computer Science University of Toronto, Sep. 2009. (pp. 1-155).

* cited by examiner

IMPLEMENTING A CLASSIFICATION MODEL FOR RECOGNITION PROCESSING

BACKGROUND

Technical Field

The present invention, generally, relates to machine learning, more particularly, to learning a model for recognition processing.

Related Art

Deep Neural Network (DNN) has been widely used in various recognition processing systems such as automatic speech recognition (ASR) systems, optical character recognition (OCR) systems, motion recognition systems, etc.

In ASR, it is known that DNNs with many hidden layers can outperform Gaussian mixture models (GMM), which is also used together with hidden Markov models (HMM) in acoustic models to determine how well each state of each HMM fits a frame or a short window of frames of coefficients that represents the acoustic input, on a variety of speech recognition benchmarks (G. Hinton, et al. "Deep Neural Networks for Acoustic Modeling in Speech Recognition." IEEE Signal Processing magazine 29(6):82-97. 2012.).

It is also known that better phone recognition can be achieved by replacing GMM by DNNs (A. Mohamed, et al. "Acoustic Modeling using Deep Belief Networks." IEEE Transactions on Audio, Speech, and Language Processing 20(1): 14-22. 2012). The networks are first pre-trained as a multilayer generative model of a window of spectral feature vector without making use of any discriminative information. Once the generative pre-training has designed the features, they perform discriminative fine-tuning using a back propagation to adjust the features slightly to make them better at predicting a probability distribution over the states of mono-phone hidden Markov model.

The DNN for the acoustic model has one or more layers of hidden units between input and output layers, and takes acoustic features as input and produces posterior probabilities over HMM states as output. For the input of DNN, a plurality of frames of acoustic features is typically used. Generally, wider input frames may retain richer information, thus resulting in better accuracy. However, using wider input frames increases latency and computation cost during the recognition process, thereby negatively impacting user experience, especially for a real-time recognition task. Hence, there is a tradeoff between accuracy and latency in a conventional DNN based acoustic model. Such a tradeoff may also arise in other recognition models, such as image recognition model, motion recognition model, etc.

What is needed is a method, associated computer system and computer program product capable of improving recognition accuracy without increasing latency and computation cost during recognition processing.

SUMMARY

The foregoing problems and shortcomings of the prior art are addressed by the present invention, in which there are provided a method, computer system and computer program product for learning a model for recognition processing.

According to an embodiment of the present principles, a method for learning a recognition model for recognition processing is provided. The method includes preparing one or more examples for learning, each of which includes an input segment, an additional segment adjacent to the input segment and an assigned label. The input segment and the additional segment are extracted from an original training data. The method further includes training a classification model, using the input segment and the additional segment in the examples, to initialize parameters of the classification model so that extended segments including the input segment and the additional segment are reconstructed from the input segment. Further, the method includes tuning the classification model to predict a target label, using the input segment and the assigned label in the examples, based on the initialized parameters. At least a portion of the classification model is included in the recognition model.

The recognition model obtained by the method according to an embodiment of the present principles may have improved recognition accuracy without increasing latency and computation cost during recognition processing.

In an embodiment according to the present principles, size of input for recognition to the classification model is equal to size of the input segment for learning. Since the input sizes are identical between the learning process and recognition process, therefore, latency of the recognition process based on the recognition model of the one embodiment may not be affected negatively.

In another embodiment according to the present principles, information outside the input segment is subsumed in the classification model by treating the input segment as input and the extended segments as prediction of the input during the training. Therefore, the classification model of the one embodiment can acquire an ability to consider broader context than actual input for recognition.

In another embodiment of the present principles, the original training data may be acoustic data, the input segment may be n-frame acoustic features, the extended segment may be n+m-frame acoustic features, and the additional segment may be m-frame acoustic features preceding and/or succeeding the n-frame acoustic features. Therefore, the recognition model of the one embodiment can be used in speech recognition processing with improved speech recognition accuracy.

In another embodiment of the present principles, the original training data may be image data, the input segment may be a $x*y$ pixel patch, the extended segment may be $(x+a)*(y+b)$ pixel patch, and the additional segment may be a $(b*x+a*y+a*b)$ pixel patch surrounding the $x*y$ pixel patch. Therefore, the recognition model of the one embodiment of the present principles can be used in image recognition processing with improved image recognition accuracy.

Computer systems and computer program products relating to one or more aspects of the present principles are also described and claimed herein.

Further, according to another embodiment of the present principles, a method for learning a feature extraction model for recognition processing is provided. The method includes preparing one or more examples for learning, each of which includes an input segment, an additional segment adjacent to the input segment and an assigned label. The input segment and the additional segment are extracted from an original training data. The method further includes training a classification model, using the input segment and the additional segment in the examples, to initialize parameters of the classification model so that extended segments including the input segment and the additional segment are reconstructed from the input segment. Further the method includes tuning the classification model, using the input segment and the assigned label in the examples. Finally, the method includes storing at least a portion of the classification model as the feature extraction model for a feature extractor. Based on input, the feature extractor outputs estimated target probabilities or activations of an internal layer of the classification model as features for a post-stage recognition model.

The feature extractor based on the feature extraction model obtained by the method according to one embodiment of the present principles can output better features for the post stage recognition model than original input, thereby improving the post stage recognition accuracy without increasing latency and computation cost.

Further, according to another embodiment of the present principles, a method for learning a classification model for recognition processing is provided. The method includes preparing one or more examples for learning, each of which includes an input segment, an additional segment adjacent to the input segment and an assigned label. The input segment and the additional segment are extracted from an original training data. The method further includes training the classification model, using the input segment and the additional segment in the examples, to initialize parameters of the classification model so that extended segments including the input segment and the additional segment are reconstructed from the input segment. Further, the method includes tuning the classification model to predict a target label, using the input segment and the assigned label in the examples, based on the initialized parameters. Finally, the method includes storing the classification model that estimates posterior probabilities over targets.

The classification model obtained by the method according to one embodiment of the present principles can have improved recognition accuracy without increasing latency and computation cost.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The forgoing and other features and advantages of the invention are apparent from the following detailed description taken in conjunction with the accompanying drawings in which:

DETAILED DESCRIPTION OF THE EMBODIMENTS

The present invention will be described using particular embodiments, and the embodiments described hereafter are understood to be only referred as examples and are not intended to limit the scope of the present invention.

One or more embodiments according to the present principles are directed to a method, computer system and computer program product for learning a model for recognition processing. The deep neural network (DNN) is one of the most promising classification models used in various recognition processing such as speech recognition, image recognition, motion recognition, etc.

Figure 1:
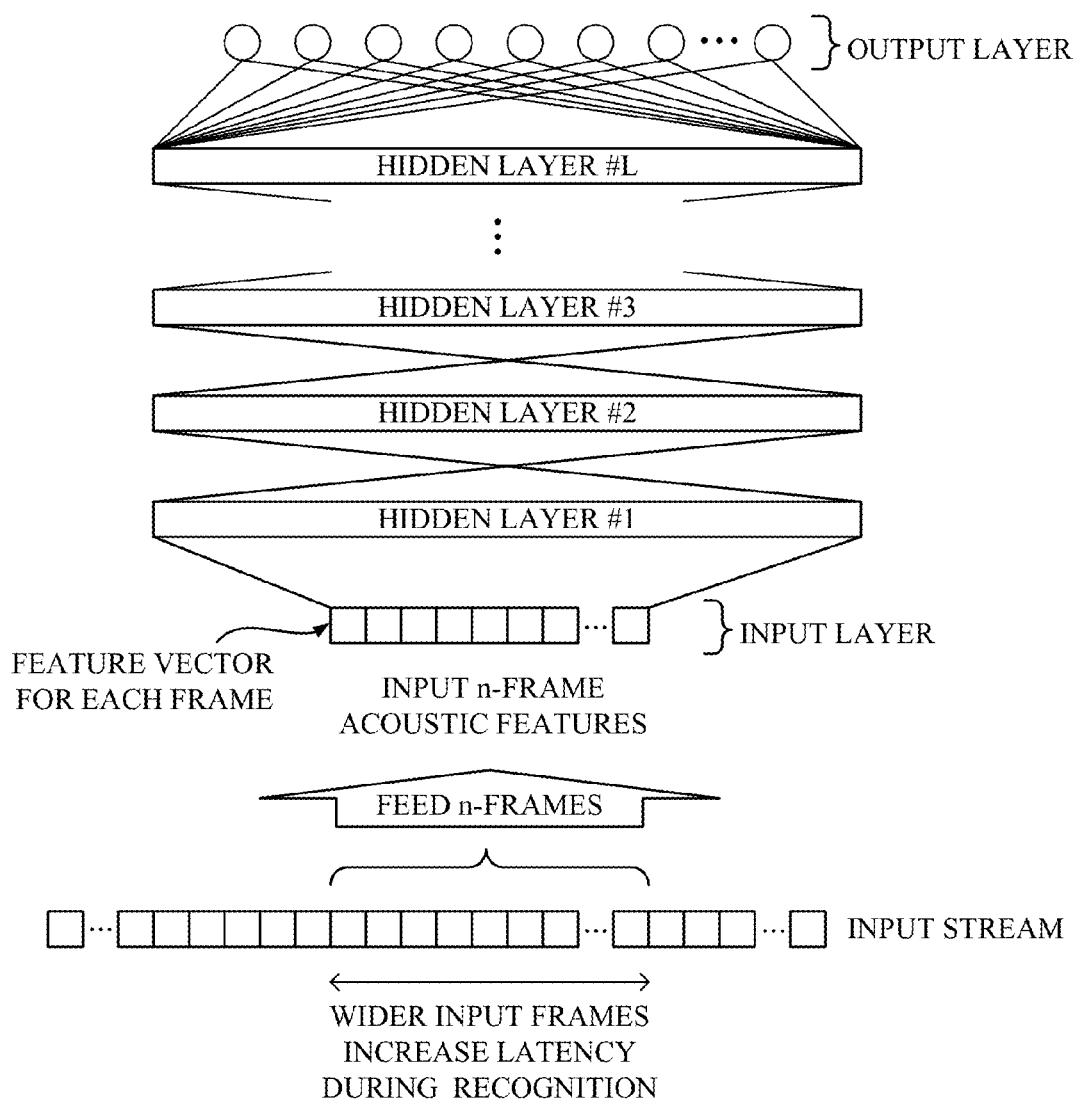
FIG. 1 shows a deep neural network (DNN) for an acoustic model in a speech recognition system.

FIG. 1 shows a DNN for the acoustic model in a speech recognition system. The DNN has one or more hidden layers (#1~#L; L represents the number of hidden layers.) with a plurality of hidden units between input and output layers. A plurality of frames of acoustic features is typically used as input for the DNN. Each frame includes a feature vector extracted from an original speech data by acoustic feature analysis. The input is represented by concatenation of the feature vectors from the plurality of the frames, therefore the input layer has (n*N) units where n represents the number of the input frames and N represents the number of dimensions of each feature vector. These input n-frame acoustic features extracted from the original input steam are fed into the DNN and then the DNN outputs posterior probability over targets corresponding to the central frame of the input frames.

Note that states of hidden Markov models (HMMs), which may be mono-phone HMMs or multi-phone (e.g., tri-phone, penta-phone, etc.) HMMs, are used for targets. The mono-phone HMMs are context-independent models. On the other hand, the multi-phone HMMs are context-dependent models where each distinct model for every different left and right phoneme contexts exists.

Generally, wider input frames may retain richer information, thus resulting in better accuracy. However, using wider input frames increases latency and computation cost during recognition processing, negatively impacting user experience, especially for a real-time speech recognition task. A tradeoff between accuracy and latency due to input frame size may arise in the DNN-based classification model in ASR.

Therefore, a method, computer system and computer program product for learning a speech recognition model capable of improving speech recognition accuracy without increasing latency and computation cost during speech recognition processing is needed.

In one or more embodiments according to the present principles, a novel training method is performed to the DNN-based classification model, in which parameters of the DNN are initialized using prepared examples so that extended frame acoustic features, including the input n-frame acoustic features and m-frame acoustic features adjacent to the input n-frame acoustic features, are reconstructed from the input n-frame acoustic features. A tuning process may be performed to the DNN-based classification model using pairs of the input n-frame acoustic features and an aligned label in the prepared examples so as to predict a target label, based on the initialized parameters of the DNN.

Since the size of the input of the DNN for recognition is the same as the size of the input n-frame acoustic features for learning while information outside the input n-frame acoustic features, that is not explicitly used in run-time, is subsumed in the DNN by the aforementioned novel training method. Hence, the obtained DNN can acquire an ability to consider broader context than actual input during recognition, thereby improving recognition accuracy without increasing latency and computation cost during the speech recognition processing.

Now, referring to the series of FIGS. 2-10, computer systems and methods for learning a model for recognition processing according to one or more embodiments of the present principles is shown.

Two approaches are provided for incorporating the DNN into HMM in the speech recognition models. In the first approach, the DNN is used to directly estimate the posterior probabilities over the targets as described in FIG. 1. In the second approach, the DNN is used to generate features as input for a standard combination of GMM and HMM, in place of or in addition to standard acoustic features.

Hereinafter, first referring to the series of FIGS. 2-5, a computer system and method for learning a recognition model according to a first embodiment of the present principles is described, in which a DNN is used to estimate posterior probabilities over targets in speech recognition processing. Then, referring to the series of FIGS. 6-8, a computer system and method for learning a recognition model according to a second embodiment of the present principles is described, in which a DNN is used to generate features as input for a standard post stage GMM/HMM system in speech recognition processing.

Furthermore, above-mentioned tradeoff may arise in various fields including image recognitions other than the speech recognition. Finally, referring to the series of FIGS. 9 and 10, a computer system and method for learning a recognition model according to a third embodiment of the present principles is described, in which a DNN is used to estimate posterior probabilities over targets in image recognition processing, to which the invention may be applicable, for instance.

First Embodiment

Figure 2:
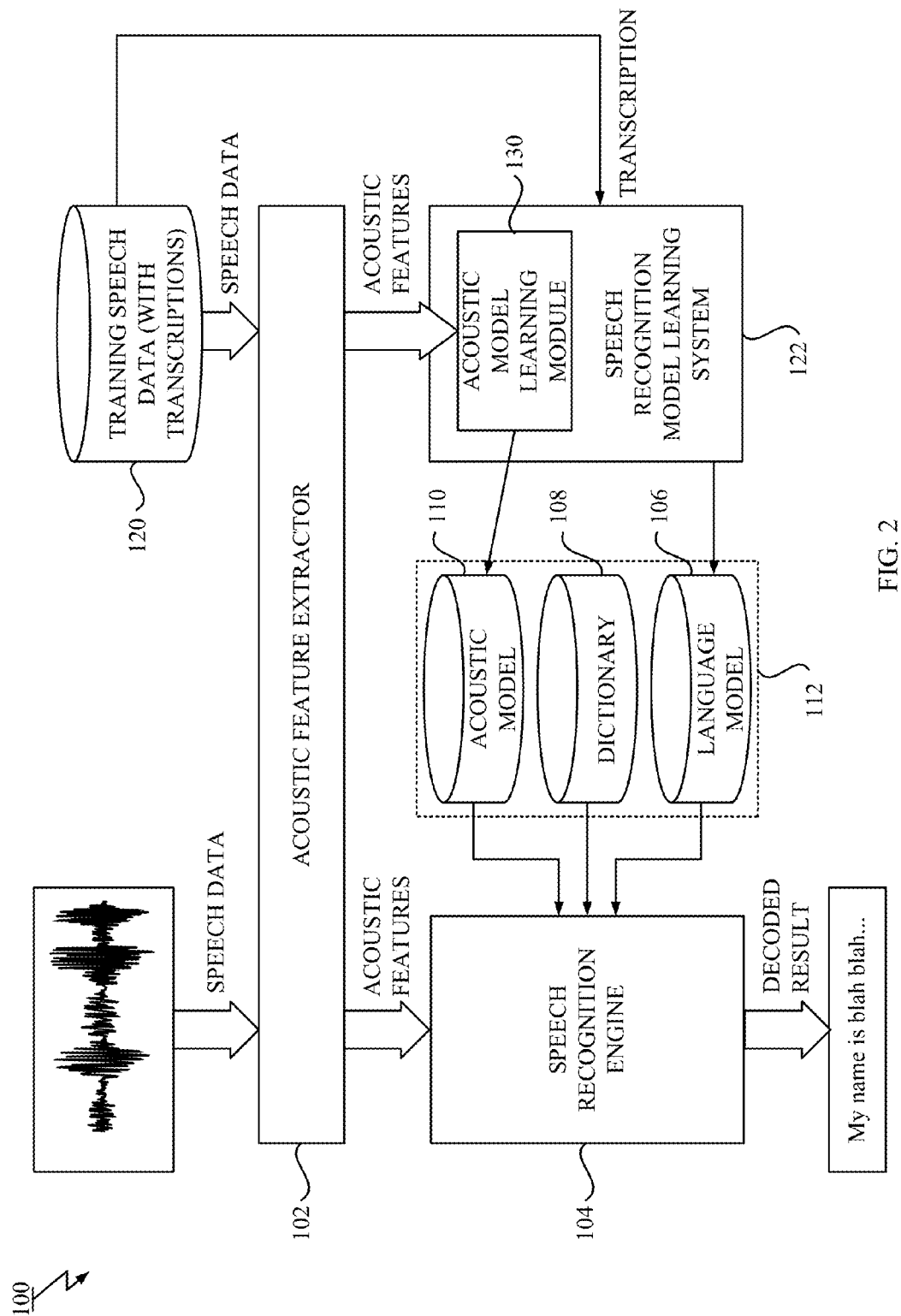
FIG. 2 illustrates a block diagram of a speech recognition system, according to an embodiment of the present principles.

FIG. 2 illustrates a block diagram of the speech recognition system according to a first embodiment of the present principles. As shown in FIG. 2, the speech recognition system 100 includes an acoustic feature extractor 102 that receives speech data and extracts acoustic features from the speech data; a speech recognition engine 104 that receives the extracted acoustic features and outputs a decoded result based on a speech recognition model 112; and a speech recognition model learning system 122 that constructs the speech recognition model 112 based on training data.

The acoustic feature extractor 102 receives the speech data digitalized by sampling analog audio input, that may be inputted from a microphone for instance, at a predetermined sampling frequency and a predetermined bit depth. The acoustic feature extractor 102 extracts the acoustic features from the received speech data by any known acoustic feature analysis and then outputs a sequence of the extracted acoustic features. The speech data may be provided as an audio file, an audio stream from a recording device such as microphone, or an audio stream via a network socket.

The speech recognition engine 104 receives the sequence of the extracted acoustic features and predicts most plausible speech contents based on the speech recognition model 112 to output the decoded result. In the first embodiment, the speech recognition model 112 includes a language model 106, a dictionary 108 and an acoustic model 110.

Here, let us represent the sequence of the acoustic features extracted from the speech data by $X=\{x_t\}$, where $t (=1, \ldots, T)$ is an index identifying the frame and $x_t$ is N dimensional feature vector at frame t. In an embodiment, the acoustic features include, but are not limited to, MFCC (Mel Frequency Cepstral Coefficient), LPC (Linear Predictive Coding) Coefficient, PLP (Perceptual Liner Prediction) Cepstral Coefficient, log mel spectrum or any combinations thereof. The acoustic features may further include dynamical features, such as delta feature and delta-delta feature of the aforementioned acoustic features.

The speech recognition is equivalent to a processing in which a corresponding most plausible word sequence $W^\wedge=\{w_i^\wedge\}$ is predicted from the sequence of the acoustic features X, where $i (=1, \ldots, I)$ is an index identifying words and $w_i^\wedge$ represents i-th word in the most plausible word sequence $W^\wedge$.

Solving within a statistical framework, the speech recognition processing may be formulated as a problem of computing $\text{argmax}_w\, p(W|X)$ and may be transformed based on Bayes' theorem as follows:

$$W^\wedge = \underset{W}{\text{argmax}}\, p(W|X) = \underset{W}{\text{argmax}}\, \log p(X|W) + \log p(W).$$

Where p(W|X) represents probabilities to generate the word sequence W when the sequence of the acoustic features X is given. p(X|W) represents probabilities to generate the sequence of the acoustic features X when the word sequence W is given, and p(W) represents prior probability distribution of the word sequence W.

The language model 106 is a model for calculating term of log p(W) in the above-mentioned formulation and may be, but is not limited to, n-gram models or neural network based models. On the other hand, the acoustic model 110 is a model for calculating term of log p(X|W) in the above-mentioned formulation. The acoustic model 110 according to the first embodiment of the present principles is based on a DNN/HMM system that uses the DNN instead of GMM in the GMM/HMM system, where the HMM is used to treat temporal variability of speech and the GMM is used to determine how well each state of each HMM matches the input.

Typically, the acoustic model 110 is modeled by sub-word units such as a phoneme or syllable. One of the most popular models is tri-phone model, where each distinct phoneme model for every different left and right phoneme contexts is used. The dictionary 108 describes mappings between each word and corresponding sub-word.

Thus, the speech recognition engine 104 finds a word sequence with maximum likelihood by integrating the language model 106 and the acoustic model 110 based on the sequence of the acoustic features inputted from the acoustic feature extractor 102, and outputs the found word sequence as the decoded result.

The speech recognition model learning system 122 performs a learning process using given training data to construct the language model 106 and acoustic model 110. In the describing embodiment, training speech data 120 with transcriptions is provided as original training data. The training speech data 120 includes a plurality of utterances, each of which has a corresponding transcription. The transcription is typically transcribed by human experts and is used to produce correct labels for each utterance.

In the first embodiment, the speech recognition model learning system 122 includes the acoustic model learning module 130 for learning the acoustic model 110 in the speech recognition model 112 based on the training speech data 120.

The acoustic model learning module 130 performs the method for learning the acoustic model 110 according to the first embodiment of the present invention. The acoustic model learning module 130 performs a novel training method on the DNN to initialize parameters of the DNN using prepared training speech data 120. The acoustic model learning module 130 performs further a tuning process to the DNN based on the initialized parameters using the prepared training speech data 120 with transcription so as to predict a target label.

In a particular embodiment, each unit described in FIG. 2 may be implemented on a computer device, where program codes according to the embodiment of the present principles are loaded on a memory and executed by a processer.

Figure 3:
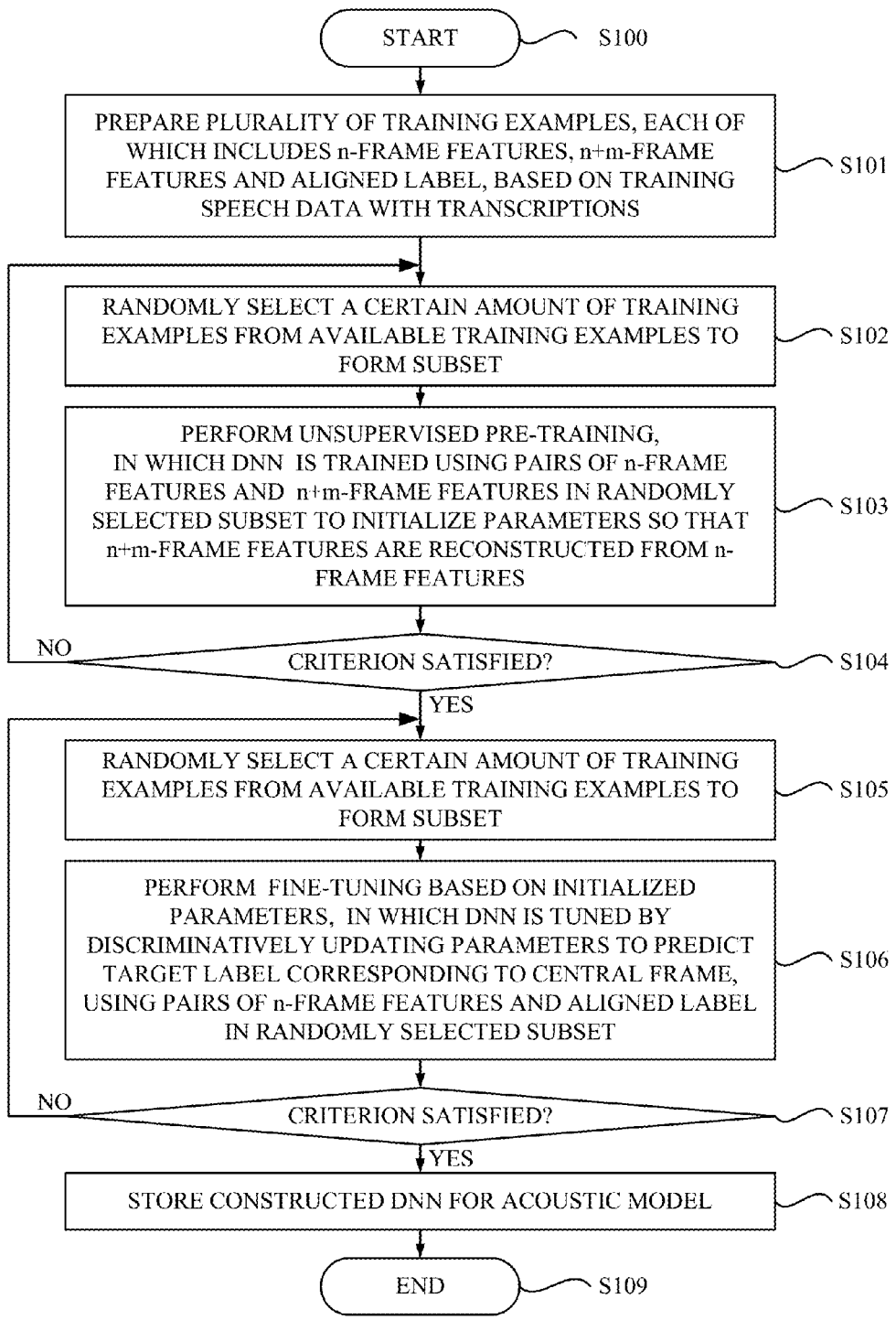
FIG. 3 is a flowchart depicting a method for learning an acoustic model in a speech recognition model, according to an embodiment of the present principles.

FIG. 3 is a flowchart depicting the method for learning the acoustic model 110 in the speech recognition model 112 according to the first embodiment of the present principles. As shown in FIG. 3, the method begins at step S100. Note that the method shown in FIG. 3 is performed by the acoustic model learning module 130 depicted in FIG. 2 for the given training speech data 120.

At step S101, the acoustic model learning module 130 prepares a plurality of training examples, each of which includes n-frame features, n+m-frame features including the n-frame features and additional m-frame features adjacent to the n-frame features, and an aligned label, based on the training speech data 120 that includes a huge amount of utterances and corresponding transcriptions.

Figure 4:
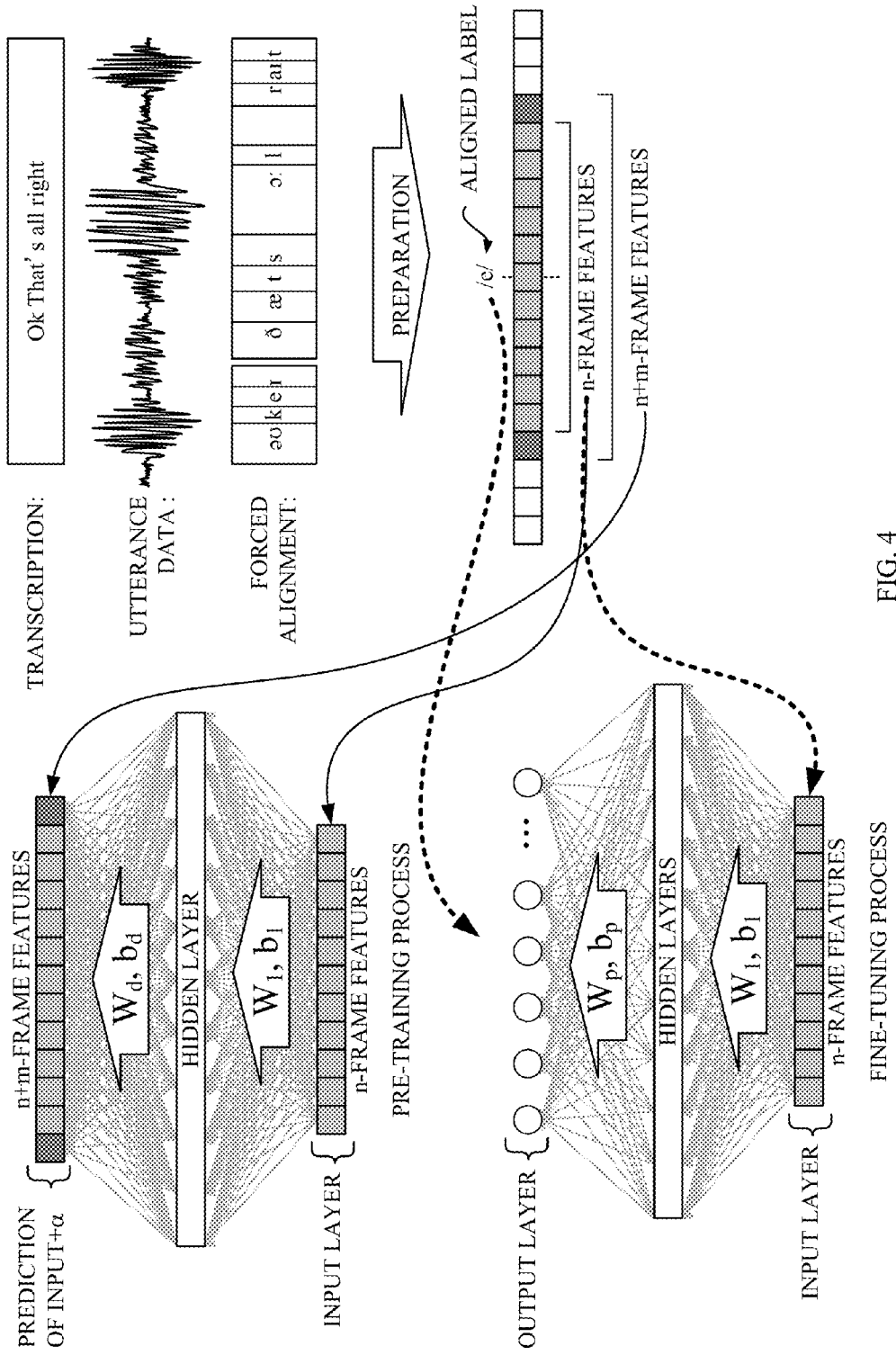
FIG. 4 shows a schematic flow of learning an acoustic model in a speech recognition model, according to an embodiment of the present invention.

FIG. 4 shows the schematic flow of learning the acoustic model 110 in the speech recognition model 112 according to the first embodiment of the present principles. The input n-frame acoustic features and the additional m-frame acoustic features are extracted from the original utterance data in the training speech data 120 by the acoustic feature extractor 102. As shown in FIG. 4, a pair of the n-frame features and the n+m-frame features is available for each frame in the given utterance data. The n+m-frame features include the n-frame features and the additional m-frame features proceeding and/or succeeding the n-frame features, and share a central frame with the n-frame features. In a particular embodiment, the additional m-frame features include a predetermined number of preceding frame features and a predetermined number of succeeding frame features. Appropriate silence frames may be appended at the beginning and the end of the utterance so as to fill up the m-frame features. Note that not all the examples in the single utterance data is being used for learning; a certain amount of the examples are randomly picked up from whole available examples for following pre-training and fine-tuning processes.

A label is aligned to each frame by forced alignment technique based on standard GMM/HHM system using the corresponding transcription. The aligned label may be a phoneme or a phoneme state.

Referring back to FIG. 3, during steps from S102 to S107 in FIG. 3, a two-step learning process that includes an unsupervised generative pre-training process and a supervised fine-tuning process is conducted. The pre-training process finds representation that well captures characteristics of the input features and stacks layers with initializing parameters of the layers. Activation in the hidden layer can be seen as a better representation that expresses input. The fine-tuning process discriminatively updates the parameters of the DNN based on the representations estimated by the pre-training process. The pre-training process and the fine-tuning process may be performed by a mini-batch algorithm where a certain amount of training examples are randomly picked up from whole examples for each iteration until a certain criterion is satisfied.

During steps from S102 to S104, the acoustic model learning module 130 performs the unsupervised generative pre-training process on the DNN. At step S102, the acoustic model learning module 130 randomly selects a certain amount of training examples from available training examples to form a subset for a current iteration. At step S103, the acoustic model learning module 130 performs unsupervised pre-training in which the DNN-based classification model is trained using pairs of the input n-frame features and the n+m-frame features in the randomly selected subset, to initialize parameters of the DNN so that the n+m-frame features are reconstructed from the input n-frame features.

Note that conventional pre-trainings are performed to a DNN so that input features are reconstructed from themselves, on the other hand, the pre-training process according to the first embodiment is performed so that the n+m-frame features are reconstructed or predicted from the input n-frame features as shown in FIG. 4.

The DNN has the one or more hidden layers between input and output layers. Here, let us represent the number of the hidden layers by L. The parameters of the DNN include weight matrices $W_i$ between layers and bias vectors $b_i$ on the layer, where i (=1, 2, . . . , L, p) is an index over the layers including the hidden layers and the output layer.

During the pre-training process, the parameters of the DNN are initialized in a layer by layer manner. In a particular embodiment, at the beginning, the pre-training process is conducted to the first hidden layer so as to initialize the weigh matrix $W_1$ and the bias vector $b_1$. The pre-training process of the first hidden layer includes optimizing forward mapping parameters $(W_1, b_1)$ and reverse mapping parameters $(W_d, b_d)$ such that a discrepancy between the prepared n+m-frame features and reconstructed n+m-frame feature is minimized. After optimizing the first hidden layer, the obtained forward mapping parameters $(W_1, b_1)$ are fixed and the reverse mapping parameters $(W_d, b_d)$ are discarded in order to stack a next layer on the first hidden layer.

In a particular embodiment, the optimization of the first hidden layer is performed by using the following loss function L $(w_1, w_d, b_1, b_d)$ for non-linear reconstruction:

$$L(W_1, W_d, b_1, b_d) = \|x_{n+m} - (W_d f(W_1 x_n + b_1) + b_d)\|^2.$$

The above mentioned loss function L is MSE (Means Square Error) measuring the discrepancy (the average error) between the prepared n+m-frame features and the reconstructed n+m-frame features, where $x_n$ represents the input n-frame features, $x_{n+m}$ represents the prepared n+m-frame features, f( ) represents sigmoid activation function, and term of $(W_d f(W_1 x_n + b_1) + b_d)$ corresponds to the reconstructed n+m-frame features from the n-frame features $x_n$. In accordance with the describing embodiment, MSE is employed as the loss function, however, any known other loss functions such as cross-entropy can be employed without departing from the scope of the present principles.

As described above, the reverse mapping parameters ($W_d$, $b_d$) are discarded when stacking layers. The reverse mapping parameter $w_d$ is typically constrained to $w_1^T$ in the conventional pre-training in order to reduce parameters. However, the constraint $W_b = W_1^T$ may be not applicable when reconstructing wider frames from actual input frames. Therefore, in an embodiment, a L1-regularization term on the reverse mapping weight $w_d$ is added to the loss function as follows:

$$L(W_1, W_d, b_1, b_d) = \|x_{n+m} - (W_d f(W_1 x_n + b_1) + b_d)\|_2 + L_1 |W_d|.$$

In the embodiment, the newly added L1-regularization term, $L_1 |W_d|$, penalizes larger value of the reverse mapping weight $w_d$ so as to subsume more information into the forward mapping parameters than the reverse mapping parameters. In accordance with the describing embodiment, the particular L1-regularization term is added to the cost function, however, any known regularization term such as L2-regularization term may be added.

Figure 5:
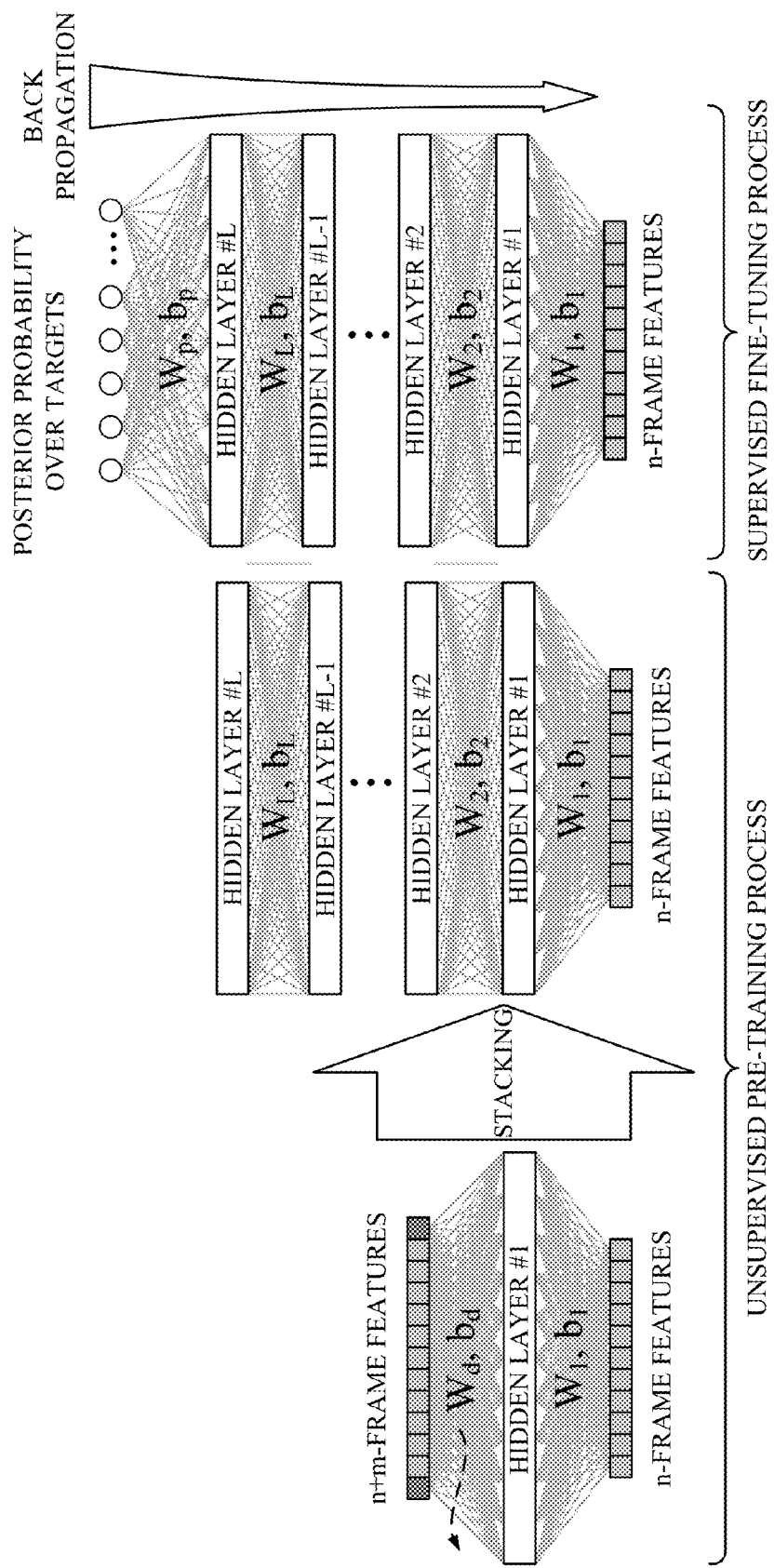
FIG. 5 depicts schematically an unsupervised pre-training process and a supervised fine-tuning process, according to an embodiment of the present principles.

FIG. 5 schematically depicts the unsupervised pre-training process and the supervised fine-tuning process according to the first embodiment of the present principles. As shown in FIG. 5, after optimizing the first hidden layer, remaining hidden layers (#2~#L) above the first hidden layer are also optimized by subsequent pre-training processes to initialize the weight matrices $W_i$ and the bias vectors $b_i$ (i=2, . . . , L) in layer-wise fashion.

In a particular embodiment, each pre-training process for the remaining hidden layers except for the first hidden layer may be conducted similarly to the conventional pre-training process. However, in other embodiments, the pre-training processes for all or any of the remaining hidden layers may be conducted similarly to the first hidden layer so as to reconstruct the n+m-frame features. In one or more embodiments according to the present principles, at least a first hidden layer just above the input layer is preferably optimized by using the novel pre-training process so that the n+m-frame features are reconstructed from the input n-frame features, because the first hidden layer can be expected to retain more information of outside the input n-frame features even after the fine-tuning process.

Referring back to FIG. 3, the pre-training process at steps S102 and S103 may be iterated until satisfying a certain pre-training criterion (means square error in the describing embodiment) or reaching a stopping criterion (times of iteration). At step S104, the acoustic model learning module 130 determines whether the criterion is satisfied, and if the criterion is not still satisfied (S104; NO), the process loops back to step S102 so as to continue the pre-training process until the criterion is satisfied. If the criterion is satisfied (S104; YES), the process advances to step S105.

During steps from S105 to S107, the acoustic model learning module 130 performs the fine-tuning process. At step S105, the acoustic model learning module 130 randomly selects a certain amount of training examples from available training examples to form a subset for current iteration. At step S106, the acoustic model learning module 130 performs the fine-tuning, in which the DNN is tuned by discriminatively updating the parameters of the DNN based on the parameters initialized by steps S102-S104 so as to predict the target label corresponding to the central frame of the input n-frame features, using pairs of the input n-frame acoustic features and the aligned label in the randomly selected subset as shown in FIG. 4.

As shown in FIG. 5, after all hidden layers of the DNN are optimized by the pre-training process, initialized parameters of the DNN including the weight matrices $W_i$ and the bias vectors $b_i$ for all hidden layers (i=1, 2, . . . , L) are obtained. Finally, the DNN based classification model is constructed by stacking the output layer on the top hidden layers #L and by adding the connections between units of the top hidden layer #L and units of the output layer with arbitrary parameters ($W_p$ and $b_p$). The whole DNN, including the initialized parameters ($w_1$, . . . , $w_L$, $b_1$, . . . , $b_L$) and newly added parameters ($W_p$ and $b_p$), are discriminatively trained by updating the parameters by using a back propagation algorithm during the supervised fine-tuning process, as shown in FIG. 5.

Referring back to FIG. 3, the fine-tuning process at steps S105 and S106 may be iterated until satisfying a certain fine-tuning criterion (such as cross entropy) or reaching a stopping criterion. At step S107, the acoustic model learning module 130 determines whether the criterion is satisfied. If the criterion is not still satisfied (S107; NO), the process returns to step S105. In response to determining that the criterion is satisfied (S107; YES), the process advances to step S108.

Because the parameters of the DNN are initialized, by the pre-training process according to the first embodiment, to a better starting point than conventionally pre-trained initial parameters, the back propagation after the pre-training process can be converged to better local optima during the fine-tuning process in comparison with the conventional pre-training.

At step S108, the acoustic model learning module 130 stores the constructed DNN for the acoustic model 110. In the first embodiment, the whole DNN is included in the acoustic model 110. After the DNN being discriminatively tuned, the DNN can output probabilities over states of the HMM. The obtained acoustic model 110, based on the DNN/HMM system, can output calculated acoustic score log p(X|W) based on the estimated posterior probabilities over the HMM states. Finally, the process ends at step S109.

In the acoustic model 110 obtained by the method according to the first embodiment of the present principles, the size of the input frames for recognition is identical to the size of the input frames for learning, and it is not necessary to modify conclusive topology, which is defined by the number of the hidden layers and the number of the units in input, hidden and output layers; hence, no overhead in latency and no extra complexity in neural network are expected. Also, information outside the input n-frame features is subsumed in the DNN so as to generate better internal representations of the input that captures the characteristics of the n+m-frame features in the DNN, by treating the input n-frame features as input and the extended n+m frame features as prediction of the input during the pre-training process. Therefore, the obtained classification model can acquire an ability to consider broader context than actual input, thereby improving the recognition accuracy without increasing latency during speech recognition processing.

Furthermore, in the describing embodiment, only the extended n+m-frame features are used for prediction of the input during the pre-training process. However, in accordance with another embodiment, attributes such as gender, age-range, etc. may be used together with the additional m-frame feature for reconstruction.

The languages, to which the present principles may be applicable, include, but by no means limited to, Arabic, Chinese, English, French, German, Japanese, Korean, Portuguese, Russian, Spanish for instance.

Second Embodiment

Figure 6:
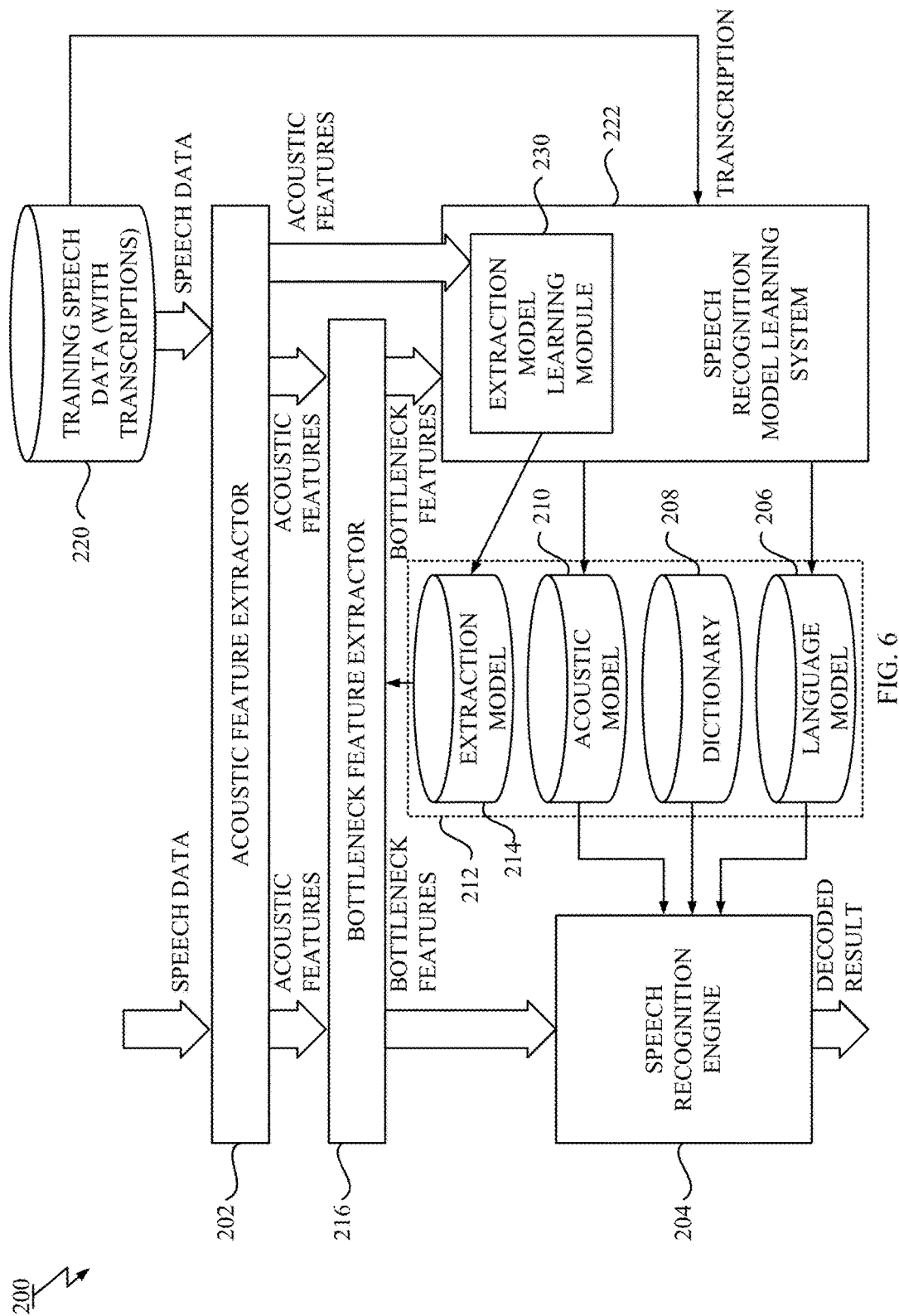
FIG. 6 illustrates a block diagram of a speech recognition system, according to an embodiment of the present principles.
Figure 7:
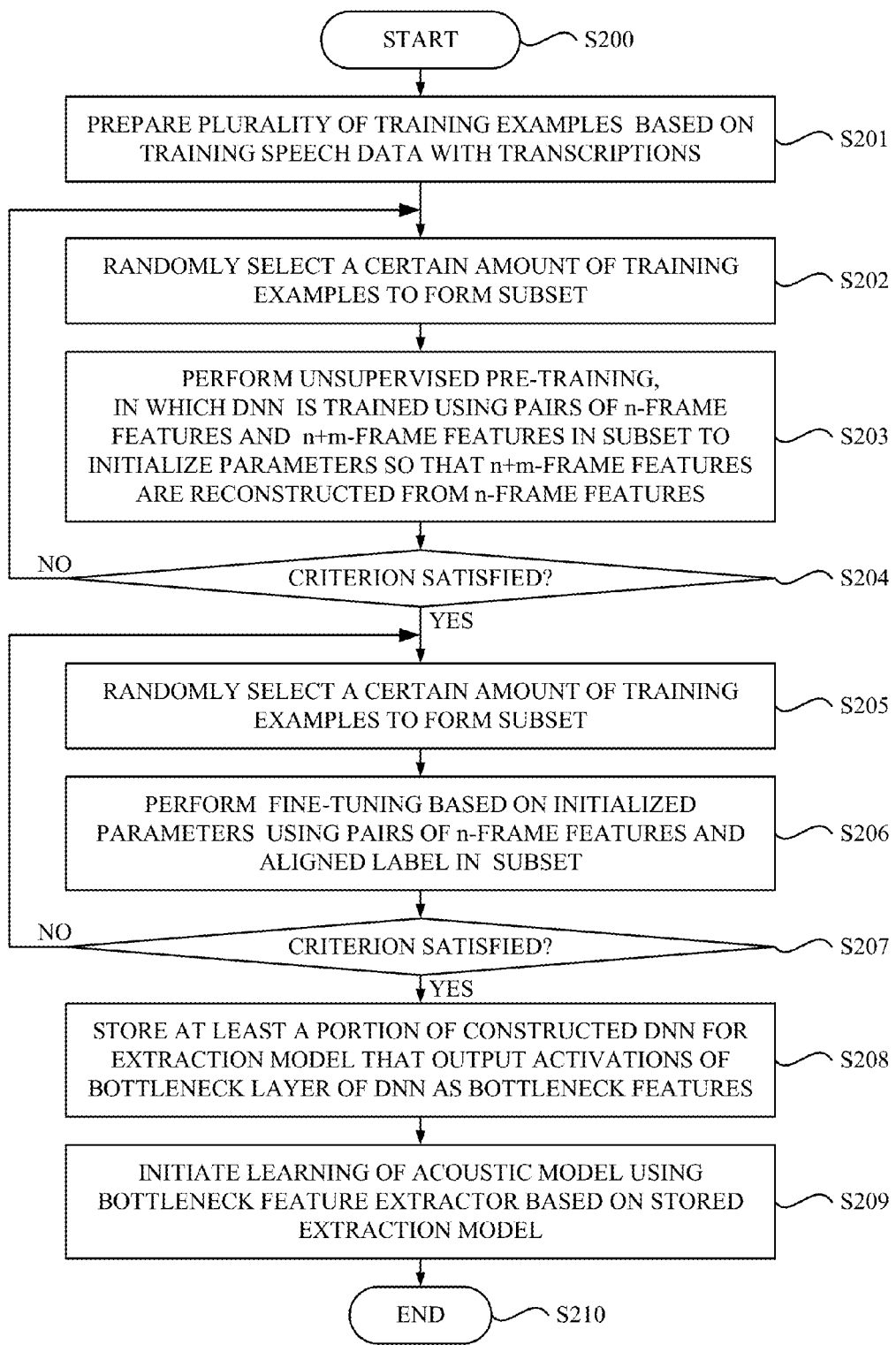
FIG. 7 is a flowchart depicting a method for learning a feature extraction model according to an embodiment of the present invention.
Figure 8:
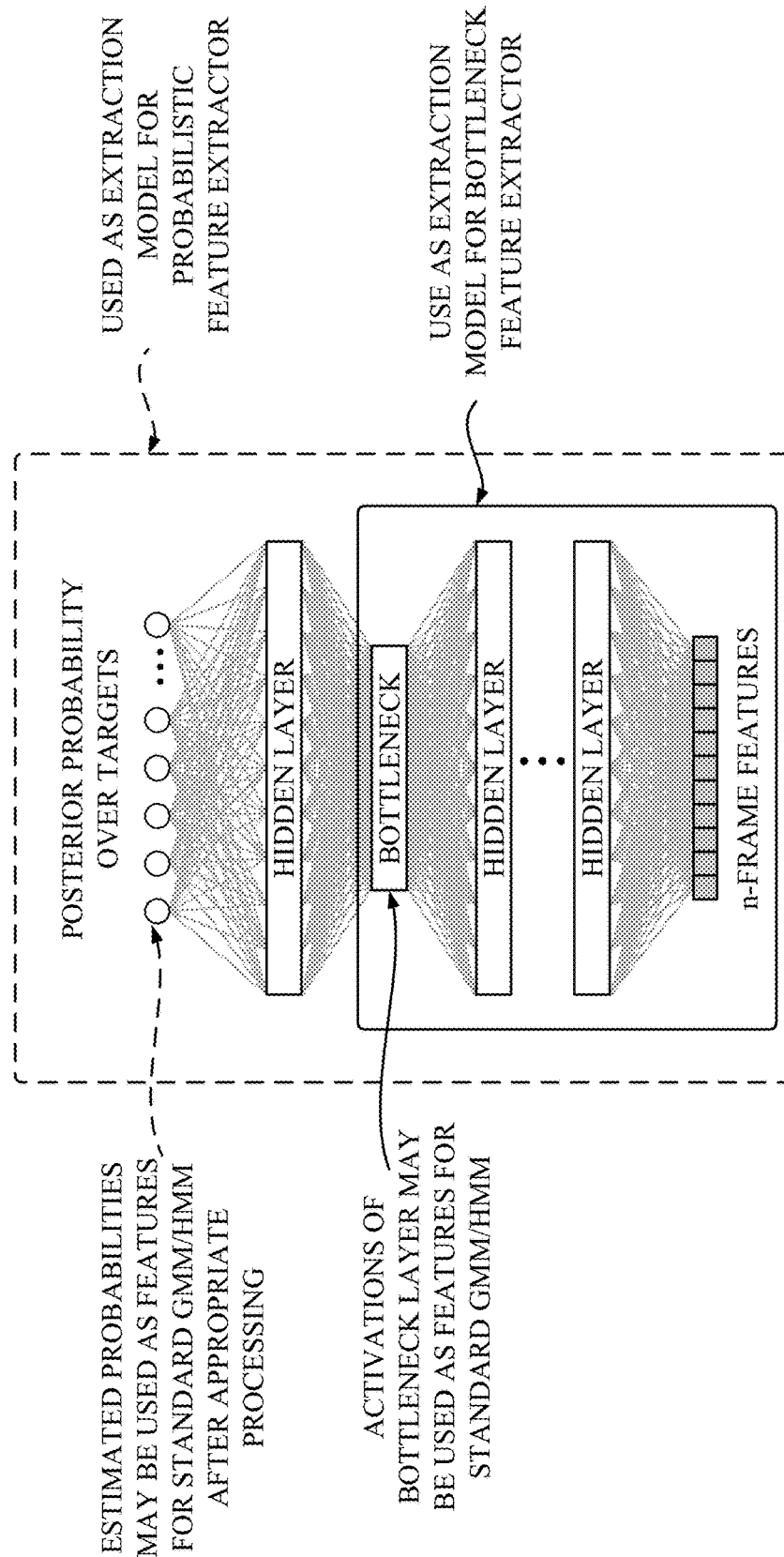
FIG. 8 shows an available portion of a DNN for a speech recognition model according to an embodiment of the present principles.

Now referring to the series of FIGS. 6-8, a computer system and method for learning a recognition model according to a second embodiment of the present principles is described.

FIG. 6 illustrates a block diagram of the speech recognition system 200 according to the second embodiment of the present principles. As shown in FIG. 6, the speech recognition system 200 includes an acoustic feature extractor 202 that receives speech data and extracts acoustic features from the speech data; a bottleneck feature extractor 216 that receives the extracted acoustic features and outputs bottleneck features in place of or in addition to the standard acoustic features based on the speech recognition model 212; a speech recognition engine 204 that receives the extracted features including the acoustic features and/or the bottleneck features and outputs a decoded result based on the speech recognition model 212; and a speech recognition model learning system 222 that constructs the speech recognition model 212 based on the training speech data 220.

In the second embodiment, the speech recognition model 212 includes a language model 206, a dictionary 208, an acoustic model 210 and a feature extraction model (hereinafter, simply referred to as the extraction model) 214. The acoustic model 210 according to the second embodiment of the present principles may be a standard GMM/HMM system, in which the GMM is used to determine how well each HMM state matches the input and the HMM is used to treat temporal variability of speech.

The speech recognition model learning system 222 performs a learning process using given training data to construct the language model 206, the acoustic model 210 and the extraction model 214. In the second embodiment, the speech recognition model learning system 222 includes an extraction model learning module 230 instead of the acoustic model learning module 130 depicted in FIG. 2.

The extraction model learning module 230 performs a method for learning the extraction model 214 according to the second embodiment of the present principles. The learned extraction model 214 is used by the bottleneck feature extractor 216 in the second embodiment. The extraction model learning module 230 performs a novel training process method on the DNN to initialize parameters of the DNN using prepared training speech data 220. The extraction model learning module 230 performs further a tuning process on the DNN by using the prepared training speech data 220 with transcription so as to predict a target label. At least a portion of the DNN is used for speech recognition model 212.

Note that acoustic features extracted by the acoustic feature extractor 202 are utilized for the learning process of the extraction model 214. After the extraction model 214 being trained, the bottleneck feature extractor 216 becomes available. Then, the speech recognition model learning system 222 performs another learning process to construct the acoustic model 210 by using the bottleneck feature extractor 216 based on the extraction model 214.

FIG. 7 is the flowchart depicting the method for learning the extraction model 214 in the speech recognition model 212 according to the second embodiment of the present principles. As shown in FIG. 7, the method begins at step S200. Note that the method shown in FIG. 7 is performed by the extraction model learning module 230 depicted in FIG. 6 for the given training speech data 220.

At step S201, the extraction model learning module 230 prepares a plurality of training examples, each of which includes n-frame features, n+m-frame features and an aligned label, based on the training speech data 120, similar to the first embodiment. The input n-frame acoustic features and the additional m-frame acoustic features are extracted from the utterance data, not by the bottleneck feature extractor 216, but by the acoustic feature extractor 202.

During steps from S202 to S207 in FIG. 7, a similar two step learning process of the DNN that includes the unsupervised pre-training process and the supervised fine-tuning process is conducted.

The DNN, according to the second embodiment of the present principles, has one or more hidden layers, and one of the hidden layers in the DNN is a bottleneck layer that has units narrower than other hidden layers. For instance, the hidden layer other than the bottleneck layer has several thousands of units, whereas the bottleneck layer has several dozens of the units. The bottleneck layer may be positioned, but not limited to, just beneath the output layer or middle of the hidden layers.

At step S208, the extraction model learning module 230 stores at least a portion of the constructed DNN as the extraction model 214 for the bottleneck feature extractor 216.

FIG. 8 shows an available portion of the DNN for the speech recognition model 212 according to the second embodiment of the present principles. As shown in FIG. 8, a network from the input layer to the bottleneck layer may be used as the extraction model 214 for the bottleneck feature extractor 216. After the DNN being discriminatively fine-tuned, the bottleneck feature extractor 216 based on the obtained extraction model 214 can output activations of the bottleneck layer in the DNN as the bottleneck features for the post-stage recognition model.

Referring back to the FIG. 7, at step S209, the extraction model learning module 230 initiates another learning process for the post stage acoustic model 210 using the bottleneck feature extractor 216. The learning process for standard GMM/HMM system will be performed based on the feature vector including the bottleneck features extracted by the bottleneck feature extractor 216. After the post stage acoustic model 210 being trained, the post stage acoustic model 210 can estimate posterior probabilities over targets based on the features and output the acoustic score calculated based on the estimated posterior probabilities over the HMM states. Note that the target of the post stage acoustic model may be same or different than that of the DNN. Finally, the process ends at step S210.

In the describing embodiment, the portion of the DNN based classification model is included as the extraction model 214 in the speech recognition model 212. And the extraction model 214 is used for the bottleneck feature extractor 216. However, the whole network from input layer to output layer may be used as the extraction model 214 in another embodiment, as depicted in FIG. 8. In another embodiment, the extraction model 214 may be used for the probabilistic feature extractor. After the DNN being discriminatively fine-tuned, the DNN can output the estimated target probabilities. The estimated target probabilities may be used as probabilistic features for the post-stage recognition model after appropriate processing, including scaling and dimension reduction. Furthermore, activations of any hidden layer in the DNN may also be utilized as features for the post-stage recognition model.

Third Embodiment

Figure 9:
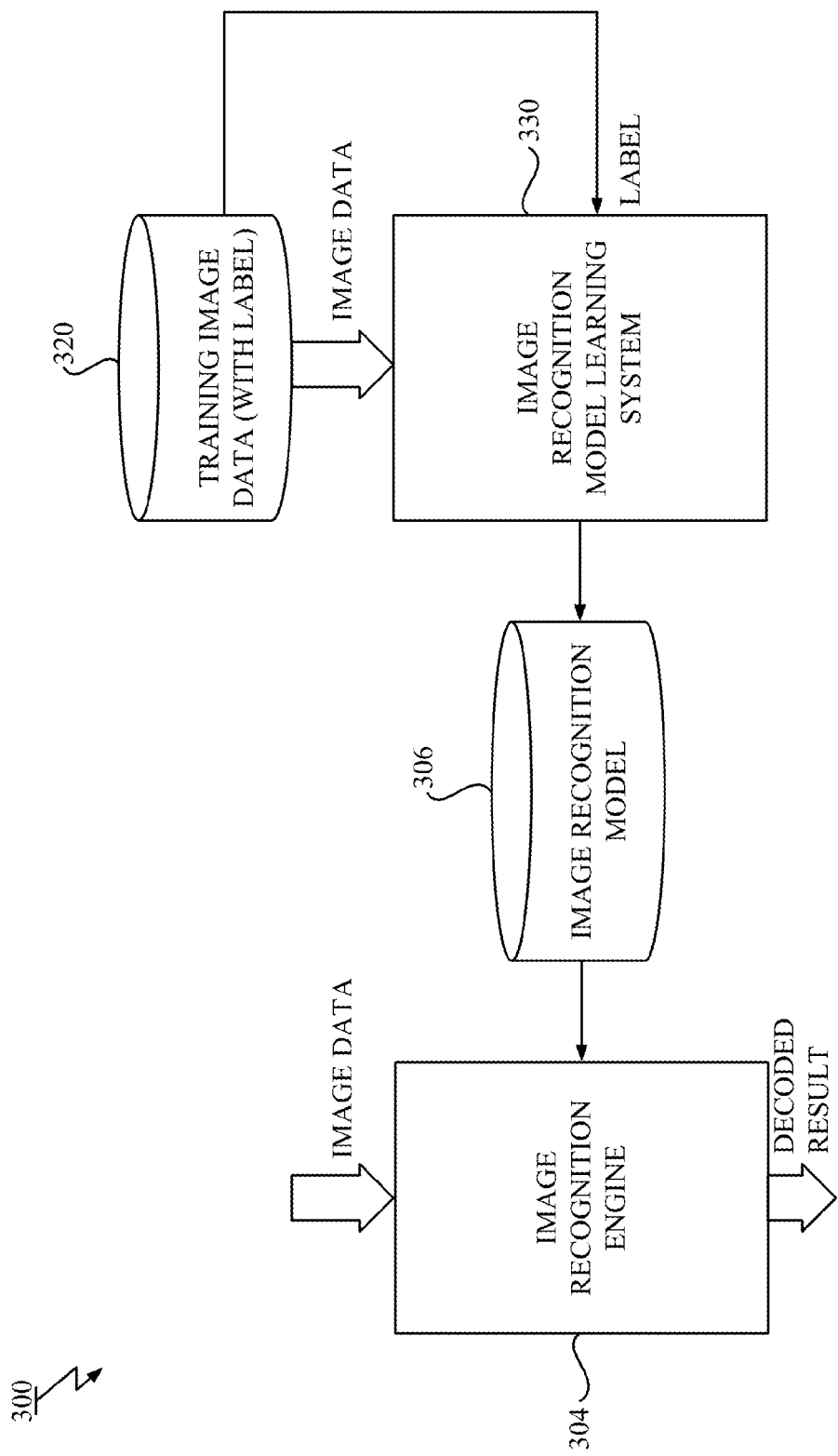
FIG. 9 illustrates a block diagram of an image recognition system according to an embodiment of the present principles.

Now referring to the series of FIGS. 9 and 10, a computer system and method for learning a recognition model according to third embodiment of the present principles is described. In the first and second embodiments, the recognition model is the speech recognition model. Therefore, original training data is the acoustic data, input segment is the n-frame acoustic features, extended segment is the n+m-frame acoustic features, and additional segment is the m-frame acoustic features preceding and/or succeeding the n-frame acoustic features. In contrast to the first and second embodiments, the recognition model of the third embodiment is an image recognition model. Thus, the original training data is image data.

FIG. 9 illustrates the block diagram of the image recognition system according to the third embodiment of the present principles. As shown in FIG. 9, the image recognition system 300 includes an image recognition engine 304 that receives the image data and outputs a decoded result based on an image recognition model 306; and an image recognition model learning system 330 that constructs the image recognition model 306 based on training image data 320.

In the third embodiment, the image recognition may be a task for classifying the image or pixel into classes, for examples, /grass/, /sky/, /car/, /cat/, etc. The image recognition engine 304 receives a x*y pixel patch as an input segment and classifies into the classes based on the image recognition model 306.

The image recognition model learning system 330 performs the method for learning the image recognition model 306 according to the third embodiment of the present principles. The image recognition model learning system 330 performs a novel training process on the DNN to initialize parameters of the DNN using prepared training image data 320. The image recognition model learning system 330 performs further a tuning process on the DNN based on the initialized parameters by using the prepared training image data 320 with label so as to classify the image data into the target classes.

Figure 10A:
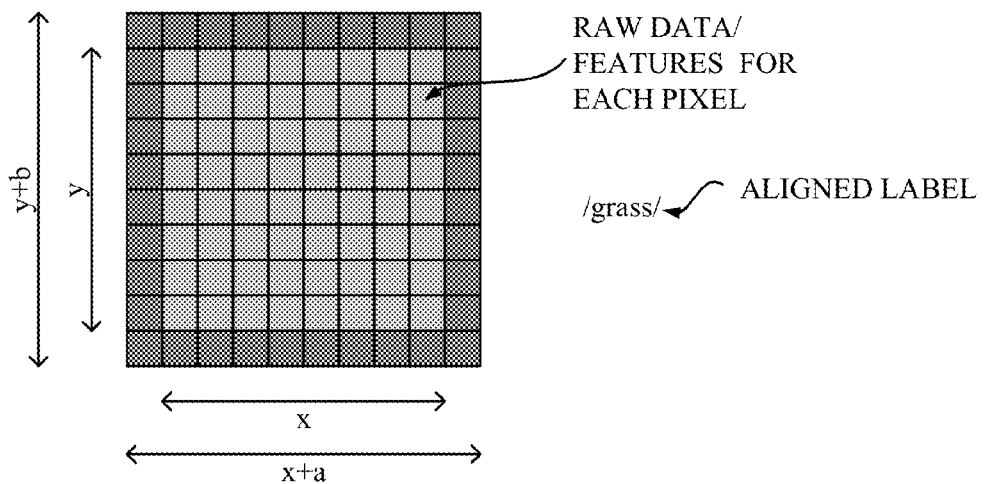
FIG. 10A depicts a training example for an image recognition model learning system according to an embodiment of the present principles.

FIG. 10A depicts a training example for the image recognition model learning system 330 according to third embodiment of the present principles. The input x*y-pixel patch and the extended (x+a)*(y+b) pixel patch including the x*y pixel patch are extracted from the original image data. Thus, in the third embodiment, the extended segment is the (x+a)*(y+b) pixel patch, and the additional segment is a (b*x+a*y+a*b) pixel patch surrounding the x*y pixel patch. Each pixel in the patch may include raw brightness values or image features. As shown in FIG. 10A, a pair of the x*y-pixel patch and the extended (x+a)*(y+b) patch is available in the given original image data. A label is assigned to each pixel, superpixel or image by any known technique.

Figure 10B:
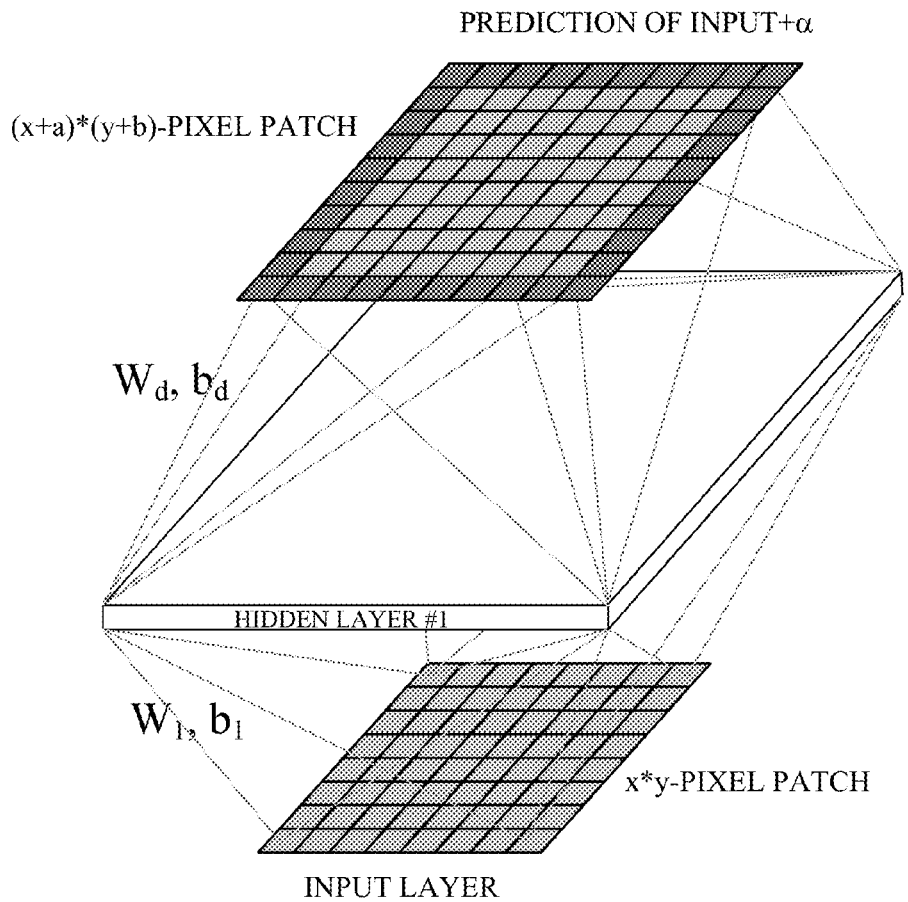
FIG. 10B shows a schematic representation of an unsupervised pre-training process according to an embodiment of the present principles.

A two-step learning process that includes the unsupervised pre-training process and the supervised fine-tuning process is also conducted on the DNN. FIG. 10B shows a schematic representation of the unsupervised pre-training process according to the third embodiment of the present principles. The image recognition model learning system 330 performs the unsupervised pre-training process, in which the DNN-based classification model is trained using pairs of the input x*y-pixel patch and the (x+a)*(y+b) extended pixel patch in the examples, to initialize parameters of the DNN so that the extended (x+a)*(y+b) pixel patch are reconstructed from the input x*y-pixel patch, as shown in FIG. 10B.

In the image recognition model 306, constructed by the method described in FIG. 9 and FIGS. 10A and 10B, according to the third embodiment of the present principles, the patch size of input for recognition to the DNN is equal to the patch size of the input for learning. Thus, no overhead in latency and no additional computation cost is expected, thereby improving recognition accuracy without increasing latency and computation cost during image recognition processing. In addition, information outside the input patch is subsumed in the DNN as the trained parameters, thereby the image recognition model 306 can acquire an ability to consider broader context than actual input.

In accordance with the aforementioned embodiments, the DNN-based classification model is preferably used as a classification model, however, the classification model, to which the invention may be applicable, is not limited to the DNN-based classification model. In addition, any neural network based classification model can be preferably used as a classification model. Furthermore, any known classification model in the art may be used without departing from the scope of the present principles.

Experimental Studies

A program implementing the system 200 shown in FIG. 6 and the method shown in FIG. 7 according to the second embodiment was coded and executed for prepared training data. A DNN having an input layer of 341 (11 frames*31 dimensions) units, four hidden layers of 1024 hidden units, a bottleneck layer of 40 units, and an output layer of 3000 units was created. The bottleneck layer was positioned just beneath the output layer. Each unit in the output layer was corresponded to each tri-phone HMM state. The target of the DNN was obtained by using GMM-HMM system for forced alignment. The feed-forward neural network was employed as the architecture of the DNN.

The 11 consecutive frames (10 ms interval) were used for the input to DNN, in both of learning and decoding processes. MFCC was employed as the acoustic features. Experiments were conducted by using a totally 50 hours transcribed speech data including utterances in Japanese, by using a mini-batch algorithm during the pre-training process and the fine-tuning process.

As examples, the pre-trainings of the first hidden layer were conducted so that 13 (=1+11+1) fame features can be reconstructed from the input 11 frame features with and without L1-reguration. As a comparative example, the pre-training of the first hidden layer was also conducted so that the 11 fame features can be reconstructed from themselves. The pre-trainings of the remaining hidden layers of the examples were conducted in a similar way to the comparative example, where the 11 fame features were reconstructed from themselves. The final DNN topologies of the examples are identical to that of the comparative example.

In both of the examples and the comparative example, after the learning of the DNN was completed, the network from the input layer to the bottleneck layer was stored as the extraction model 214 for the bottleneck feature extractor 216 shown in FIG. 6. The activations of the bottleneck layer were used as the bottleneck features in place of the standard acoustic features. Then, the GMM training was conducted, where Maximum likelihood training was conducted followed by the feature-space and the model-space discriminative training, by using the bottleneck feature extractor 216 based on the obtained extraction model 214.

Unless otherwise noted, any portions of the speech recognition model except for the feature extractor and the acoustic model were approximately identical between the examples and the comparative example.

Then, ASR accuracy of the constructed speech recognition models of the examples and the comparative example was evaluated with messaging (MSG) and voice searching (OVS) test sets on mobile device. The messaging test is a speech-to-text task for preparing message and the voice searching test is a speech-to-text task for creating search query for search engine. The following Hybrid Error Rate (HER) was utilized as ASR accuracy metric:

$$HER_i = \begin{cases} KER_i, & \text{if } (C \times Ker_i < A \times CER_i - B) \\ CER_i, & \text{otherwise} \end{cases}.$$

In the above formulation, KER represents kana error rate; CER represents character error rate; parameter A is an arbitrary positive number; parameter B is an arbitrary positive or negative number, or zero; parameter C is an arbitrary positive number; and i represents the number of utterances. In the experiment, parameter set {A=⅓; B=0; C=1} was used.

The evaluated results of the examples and the comparative example are summarized as follows:

| Pre-training conditions (Number of reconstructed frames, [w/wo L1-Regularization]) | HER | | |
|---|---|---|---|
| | MSG | OVS | average |
| Comparative Example (11 frames) | 13.527 | 17.287 | 15.407 |
| Example 1 (13 frames without L1-Regularization) | 13.412 | 17.095 | 15.254 |
| Example 2 (13 frames with L1-Regularization) | 13.284 | 17.021 | 15.153 |

By comparison with the result of the comparative example, Example 2 using 13 reconstructed frames with L1-regularization was shown to reduce average HER by approximately 1.6%, showing improvement of recognition accuracy.

Cloud Environment Implementation

It is understood in advance that although this disclosure includes a detailed description on cloud computing, implementation of the teachings recited herein are not limited to a cloud computing environment. Rather, embodiments of the present principles are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
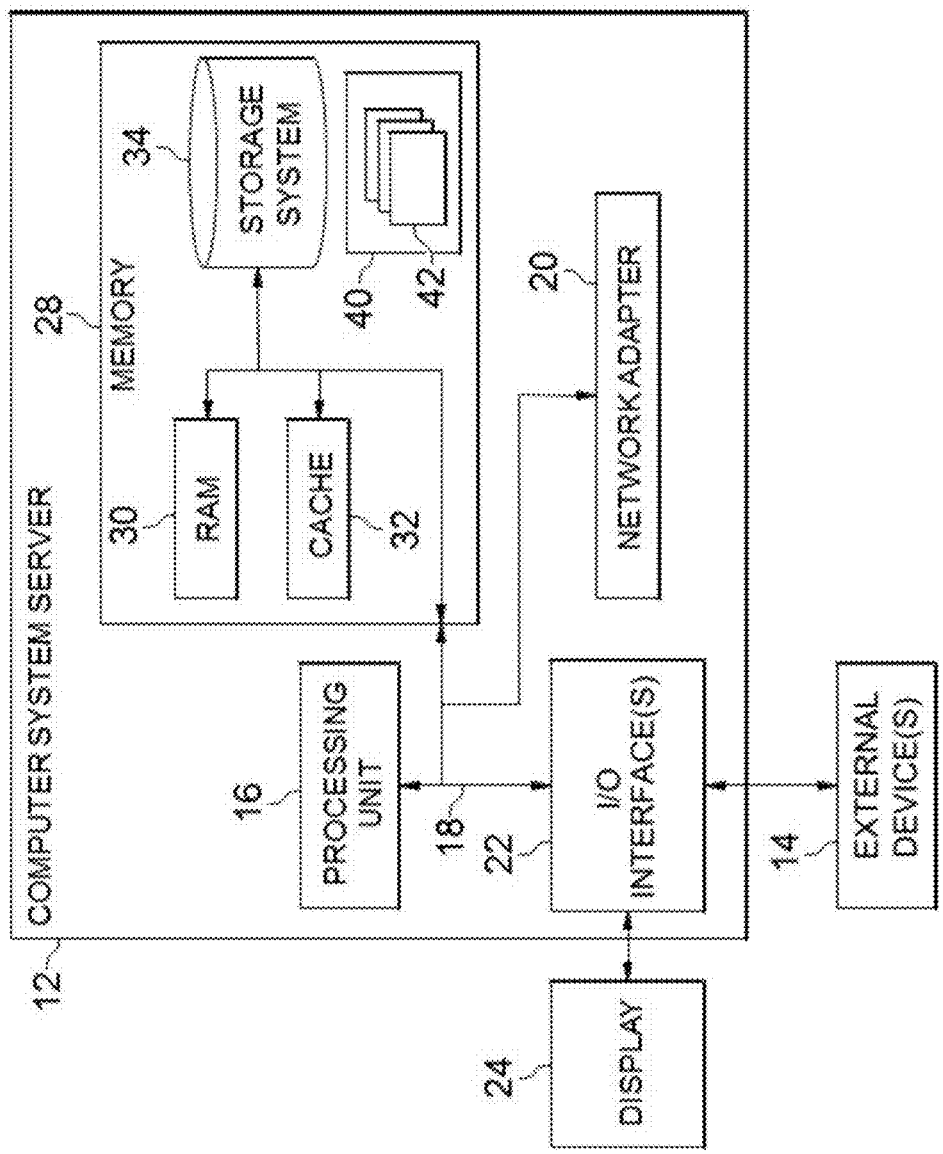
FIG. 11 depicts a cloud computing node according to an embodiment of the present principles.

Referring now to FIG. 11, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
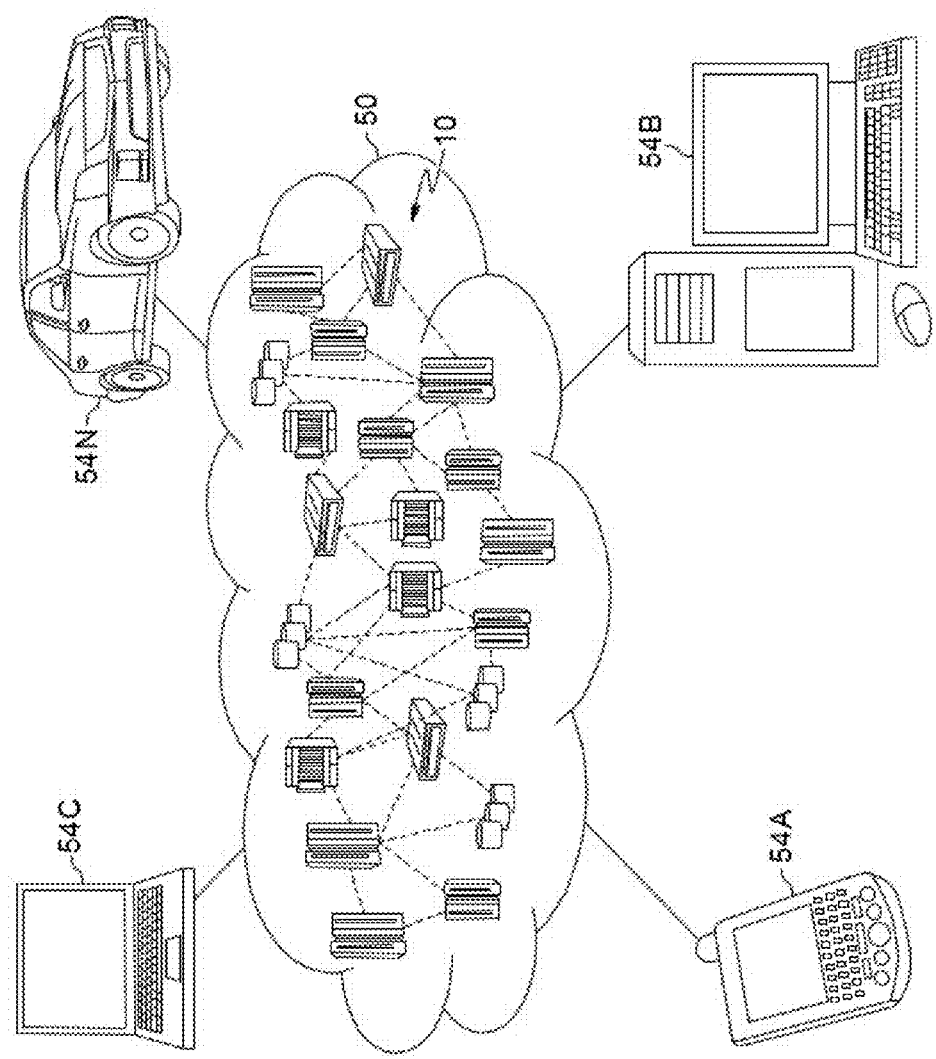
FIG. 12 depicts a cloud computing environment according to an embodiment of the present principles.

Referring now to FIG. 12, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 13:
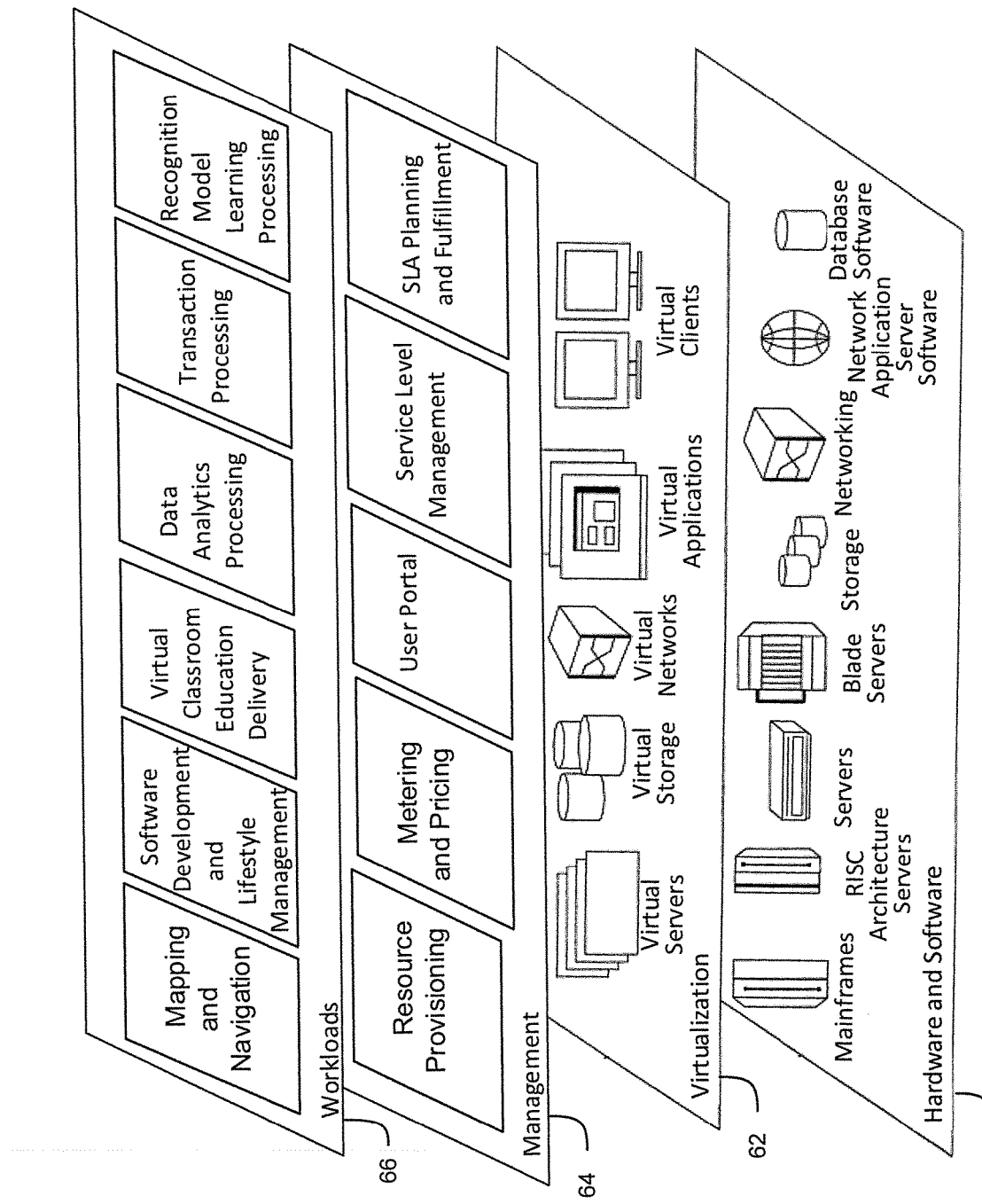
FIG. 13 depicts abstraction model layers according to an embodiment of the present principles.

Referring now to FIG. 13, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and recognition model learning processing.

In a particular embodiments, a computer program product or software that implements the recognition model learning processing in accordance with embodiments described herein, as a service in a cloud environment, is provided. In a particular embodiment, at least one of the above-mentioned pre-training process and the fine-tuning process of the DNN based classification model may be performed in the cloud computing environment.

Computer Program Implementation

The present principles may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present principles. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present principles has been presented for purposes of illustration and description, but is not intended to be exhaustive or limited to the invention in the form disclosed.

The descriptions of the various embodiments of the present principles have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for learning a recognition model for recognition processing, the method comprising:
   preparing one or more examples for learning, each of which includes an input segment, an additional segment adjacent to the input segment and an assigned label, the input segment and the additional segment being extracted from an original training data;
   training a classification model, using a processor, using the input segment and the additional segment in the examples to initialize parameters of the classification model to provide initialized parameters so that extended segments, including the input segment and the additional segment, are reconstructed from the input segment without use of further segments to provide reconstructed extended segments; and
   tuning the classification model to predict a target label, using the input segment and the assigned label in the examples, based on the initialized parameters, at least a portion of the classification model being included in the recognition model.

2. The method of claim 1, wherein the recognition model includes all portions of the classification model, the classification model estimating posterior probabilities over targets.

3. The method of claim 1, wherein the recognition model uses the at least portion of the classification model as a feature extraction model for a feature extractor and includes a post-stage recognition model, the feature extractor outputting estimated target probabilities or activations of an internal layer of the classification model as features for the post-stage recognition model, the post-stage recognition model estimating posterior probabilities over targets based on the features.

4. The shod of claim 1, wherein a size of input for recognition to the classification model is equal to a size of the input segment for learning.

5. The method of claim 1, wherein information outside the input segment is subsumed in the classification model by treating the input segment as input and the extended segments as prediction of the input during the training.

6. The method of claim 1, wherein the training includes:
   optimizing forward mapping parameters and reverse mapping parameters of a layer in the classification model such that a discrepancy between the extended segments and the reconstructed extended segments from the input segment is minimized, the reverse mapping parameters being discarded in response to stacking the layer within the classification model.

7. The method of claim 6, wherein a regularization term is added to a loss function measuring the discrepancy, the regularization term penalizing larger values of the reverse mapping parameters so as to subsume more information h forward mapping parameters than the reverse mapping parameters.

8. The method of claim 1, wherein the classification model includes a deep neural network having one or more hidden layers between an input layer for the input segment and an output layer for targets, the training is included in an unsupervised pre-training process that stacks the one or more hidden layers, the input layer, and the output layer with initializing parameters, the tuning is a fine-tuning process that discriminatively updates the parameters of the layers, the deep neural network is incorporated into a hidden Markov model (HMM) and the targets of the classification model are HMM states.

9. The method of claim 1, wherein the original training data is acoustic data, the input segment is n-frame acoustic features, the extended segment is n+m-frame acoustic features, and the additional segment is m-frame acoustic features preceding and/or succeeding the n-frame acoustic features.

10. The method of claim 1, wherein the original training data is image data, the input segment is a x*y pixel patch, the extended segment is (x+a)*(y+b) pixel patch, and the additional segment is a (b*x+a*y+a*b) pixel patch surrounding the x*y pixel patch.

11. The method of claim 1, wherein at least one of the training and the tuning of the classification model is performed in a cloud corrupting environment.

12. A computer system for learning a recognition model for recognition processing by executing program instructions tangibly stored in a memory, the computer system comprising:
a processor in communication with the memory, wherein the computer system is configured to:
prepare one or more examples for learning, each of which includes an input segment, an additional segment adjacent to the input segment and an assigned label, the input segment and the additional segment being extracted from an original training data;
train a classification model, using the input segment and the additional segment in the examples to initialize parameters of the classification model to provide initialized parameters so that extended segments, including the input segment and the additional segment, are reconstructed from the input segment without use of further segments to provide reconstructed extended segments; and
tune the classification model to predict a target label, using the input segment and the assigned label in the examples, based on the initialized parameters, at least a portion of the classification model being included in the recognition model.

13. The computer system of claim 12, wherein the recognition model includes a whole of the classification model, the classification model estimating posterior probabilities over targets.

14. The computer system of claim 12, wherein the recognition model uses the at least a portion of the classification model as a feature extraction model for a feature extractor and includes a post-stage recognition model, the feature extractor outputting estimated target probabilities or activations of an internal layer of the classification model as features for the post-stage recognition model, the post-stage recognition model estimating posterior probabilities over targets based on the features.

15. The computer system of claim 12, wherein a size of input for recognition to the classification model is equal to a size of the input segment for learning.

16. The computer system of claim 12, wherein information outside the input segment is subsumed in the classification model by treating the input segment as input and the extended segments as prediction of the input during the training.

17. The computer system of claim 12, wherein the computer system is further configured to:
optimize forward mapping parameters and reverse mapping parameters of a layer in the classification model such that a discrepancy between the extended segments and the reconstructed extended segments from the input segment is minimized, the reverse mapping parameters being discarded in response to stacking the layer within the classification model.

18. The computer system of claim 17, wherein a regularization term is added to a loss function measuring the discrepancy, the regularization term penalizing larger value of the reverse mapping parameters so as to subsume more information into the forward mapping parameters than the reverse mapping parameters.

19. The computer system of claim 12, wherein the computer system is provided in a cloud computing environment.

20. A computer program product for learning a recognition model for recognition processing, the computer program product comprising a computer readable storage medium having program instructions embodied therewith, the program instructions executable by a computer to cause the computer to perform a method comprising:
preparing one or more examples for learning, each of which includes an input segment, an additional segment adjacent to the input segment and an assigned label, the input segment and the additional segment being extracted from an original training data;
training a classification model, using a processor, using the input segment and the additional segment in the one or more examples to initialize parameters of the classification model to provide initialized parameters so that extended segments, including the input segment and the additional segment, are reconstructed from the input segment without use of further segments to provide reconstructed extended segments; and
tuning the classification model to predict a target label, using the input segment and the assigned label in the one or more examples, based on the initialized parameters, at least a portion of the classification model being included in the recognition model.

21. The computer program product of claim 20, wherein the recognition model includes a whole of the classification model, the classification model estimating posterior probabilities over targets.

22. The computer program product of claim 20, wherein the recognition model uses the at least a portion of the classification model as a feature extraction model for a feature extractor and includes a post-stage recognition model, the feature extractor outputting estimated target probabilities or activations of an internal layer of the classification model as features for the post-stage recognition model, the post-stage recognition model estimating posterior probabilities over targets based on the features.

23. A method for learning a feature extraction model for recognition processing, the method comprising:

preparing one or more examples for learning, each of which includes an input segment, an additional segment adjacent to the input segment and an assigned label, the input segment and the additional segment being extracted from an original training data;

training a classification model, using a processor, using the input segment and the additional segment in the examples to initialize parameters of the classification model to provide initialized parameters so that extended segments, including the input segment and the additional segment, are reconstructed from the input segment to provide reconstructed extended segments, wherein the training includes:

optimizing forward mapping parameters and reverse mapping parameters of a layer in the classification model such that a discrepancy between the extended segments and the reconstructed extended segments from the input segment is minimized, the reverse mapping parameters being discarded in response to stacking the layer within the classification model, wherein a regularization term is added to a loss function measuring the discrepancy, the regularization term penalizing larger values of the reverse mapping parameters so as to subsume more information into the forward mapping parameters than the reverse mapping parameters;

tuning the classification model, using the input segment and the assigned label in the examples; and storing at least a portion of the classification model as the feature extraction model for a feature extractor, the feature extractor outputting, based on input, estimated target probabilities or activations of an internal layer of the classification model as features for a post-stage recognition model.

24. A method for learning a classification model for recognition processing, the method comprising:

preparing one or more examples for learning, each of which includes an input segment, an additional segment adjacent to the input segment and an assigned label, the input segment and the additional segment being extracted from an original training data;

training the classification model, using a processor, using the input segment and the additional segment in the examples to initialize parameters of the classification model to provide initialized parameters so that extended segments, including the input segment and the additional segment, are reconstructed from the input segment without use of further segments to provide reconstructed extended segments;

tuning the classification model to predict a target label, using the input segment and the assigned label in the examples, based on the initialized parameters; and storing the classification model, the classification model estimating, based on input, posterior probabilities over targets.

* * * * *